(12) United States Patent
Kato et al.

(10) Patent No.: US 7,991,317 B2
(45) Date of Patent: Aug. 2, 2011

(54) AUTOMATIC JOB TEMPLATE GENERATING APPARATUS AND AUTOMATIC JOB TEMPLATE GENERATION METHOD

(75) Inventors: Hiroyuki Kato, Shizuoka-ken (JP); Sunao Tabata, Shizuoka-ken (JP); Haruhiko Ishida, Tokyo (JP); Masao Yamaguchi, Tokyo (JP); Takahiro Fuchigami, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/676,334

(22) Filed: Feb. 19, 2007

(65) Prior Publication Data

US 2008/0199199 A1    Aug. 21, 2008

(51) Int. Cl.
*G03G 15/00*    (2006.01)
(52) U.S. Cl. .............................. 399/81; 399/77; 358/448
(58) Field of Classification Search .................... 399/42, 399/81
See application file for complete search history.

(56) References Cited

U.S. PATENT DOCUMENTS

| 6,795,663 | B2 | 9/2004 | Kato | |
|---|---|---|---|---|
| 7,124,209 | B2 | 10/2006 | Kato | |
| 2004/0052543 | A1* | 3/2004 | Kato | 399/81 |

FOREIGN PATENT DOCUMENTS

| JP | 04-162054 | 6/1992 |
|---|---|---|
| JP | 2003-143400 | 5/2003 |
| JP | 2005-196734 | 7/2005 |
| JP | 2005-242922 | 9/2005 |

* cited by examiner

*Primary Examiner* — David M Gray
*Assistant Examiner* — Roy Yi
(74) *Attorney, Agent, or Firm* — Turocy & Watson, LLP

(57) ABSTRACT

In order to provide an automatic job template generating apparatus capable of making operations simpler by reducing the steps in the user interface operation to match a frequently used capability of an MFP, an automatic job template generating apparatus of the invention is formed of an operation history acquisition unit configured to acquire an operation history of a multi function peripherals for each user according to information accessed to the multi function peripherals on the Web, an operation frequency analysis unit configured to analyze an operation frequency at regular timing according to the operation history acquired by the operation history acquisition unit, and a job template generation unit configured to newly generate a job execution parameter having a high operation frequency on an operation screen as a job template button according to an analysis result of the operation analysis unit.

18 Claims, 17 Drawing Sheets

FIG.13

Template Properties

Group Information

| No. | Group Name | Owner |
|---|---|---|
| 001 | kato | Hiroyuki Kato |

Template Information

| No. | Template Name | Owner |
|---|---|---|
| 3 | Send to_Email | |

Agent Settings

Send to Email [Select]

[Back] [Next]

*Required

| To | Number of Recipients : 0<br>Go to Recipient List |
|---|---|
| Subject | ⊙ Scanned from (Device Name) [(Template Name)] (Date) (Time)<br>○ _____ (Date) |
| *From | Hiroyuki1_Kato@toshibatec.co.jp |
| From Name | |
| Body | ⊙ No Message<br>○ The maximum size for body is about 1KB<br>[text area] |
| File Format | MultiPage TIFF(G4) |
| Maximum Message Size | 20 MB |
| Fragment Message | ⊙ No Fragmentation<br>○ 64 KB<br>○ 256 KB<br>○ 512 KB |

INTRANET

FIG.22

| JOB EXECUTION DATE | JOB EXECUTION PLACE | JOB EXECUTION CONTENT (TYPE OF JOB) | JOB EXECUTION PARAMETER | EXECUTED IMAGE DATA |
|---|---|---|---|---|
| 2006/3/25 | MFP A | Copy | 10 COPIES, DUPLEX, AUTO EXPOSURE, AUTO COLOR SELECT MODE, ... | (SAVE IMAGE DATA INTACT) |
| 2006/3/25 | MFP A | Scan to File | | |
| 2006/3/25 | MFP A | Scan to Email | | |
| 2006/3/26 | MFP B | FAX TRANSMISSION | | |
| ... | ... | ... | ... | |

FIG.23

| TEMPLATE GROUP ID | TEMPLATE ID | TEMPLATE NAME | OWNER OF TEMPLATE | JOB EXECUTION PARAMETER | IMAGE DATA EXECUTED IN THE PAST |
|---|---|---|---|---|---|
| 001 | 001 | ○○REGULAR MEETING REFERENCE COPY | MR. A | 10 COPIES, DUPLEX, AUTO EXPOSURE, AUTO COLOR SELECT MODE, ... | (SAVE IMAGE DATA INTACT) |
| 001 | 002 | Scan to File | MR. B | | |
| 001 | 003 | Scan to Email | MR. C | | |
| 002 | 001 | FAX TRANSMISSION | MR. D | | |
| ... | ... | ... | | ... | |

AUTOMATIC JOB TEMPLATE GENERATING APPARATUS AND AUTOMATIC JOB TEMPLATE GENERATION METHOD

BACKGROUND OF THE INVENTION

1. Field of the Invention

The present invention relates to an automatic job template generating apparatus and an automatic job template generation method for generating a job execution parameter in an MFP (Multi Function Peripherals) or the like.

2. Description of the Related Art

As an image processing apparatus that integrates the capabilities of a copying machine, a facsimile machine, a printer, a scanner, and so forth into a single machine to provide these capabilities efficiently to office operations, a complex machine called an MFP has been used extensively. Such an MFP is furnished with a capability of storing various settings of a job in a single template icon to enable the user to launch the job with a desired parameter by merely depressing the template icon from the next time he launches the job. Such a template icon is called a job template and is used extensively in the MFP and the like.

The job template is classified into some groups by the types of jobs, and is called by a different name given to each type of job in some cases. As an example of the classification of the job template, for instance, a copy job is called by the name of mode memory and used for the scan settings, such as the number of copies and the scan mode. Alternatively, it is used for the finishing settings, such as with or without stapling or hole punching and duplex or simplex printing.

Also, a scan job is called by the name of scan template, and used for the scan settings, such as the scan mode, the resolution, and the rotation. Alternatively, it is used for the agent settings, such as the file name and the address of the transfer destination. Further, a facsimile transmission job is called by the name of program key, and used for the scan settings, such as the resolution, and the address settings of the transfer destination. There is a case where all are called job templates to form a job execution parameter group regardless of the types of job.

Patent Document 1 (JP-A-2004-3757305) discloses a technique of an automatic job template generating apparatus capable of triggering automatic generation of a desired job template upon occurrence of an event at an associated information terminal (for example, a change in address book information) and notifying the associated information terminal of a change in the settings of the job template in an MFP.

Further, Patent Document 2 (JP-A-2001-077959) discloses a technique to automatically change the display order of the job templates in the list in order of decreasing use frequency by accumulating and analyzing operation history information of an MFP, to perform input complementation to recommend a frequently used parameter on a priority basis in the wizard screen during the generation of the job template, or to change the default value of the job template to be displayed to a frequently used one.

The automatic job template generating apparatus in the related art as described above, however, is configured to set the job execution parameter as the standard mode for each job by utilizing the operation history information, and therefore updates the default value on a job issuing screen of each job using the analysis result of the operation history. In other words, because of the job execution by which a job starts when the start button is depressed, the default value is updated on the parameter input screen.

However, even with the same type of job (for example, a copy job), the frequently used job execution parameter differs often among users. Hence, there is a case where the frequently used job execution parameter cannot be used quickly for plural users by merely updating the default value of the job execution parameter on the default screen of each job.

SUMMARY OF THE INVENTION

The invention was devised to solve the problems discussed above, and has an advantage to provide an automatic job template generating apparatus and an automatic job template generation method for making it possible to automatically generate a job template that makes operations simpler by reducing the steps in the user interface operation to match the capability (work flow) of a frequently used MFP.

In order to solve the problems discussed above, an automatic job template generating apparatus of the invention includes: an operation history acquisition unit configured to acquire an operation history of a multi function peripherals in a correspondence with a user; an operation frequency analysis unit configured to analyze an operation frequency at specific timing according to the operation history acquired by the operation history acquisition unit; and a job template generation unit configured to newly generate a job execution parameter having a high operation frequency on an operation screen as a job template button according to an analysis result by the operation frequency analysis unit.

Also, another automatic job template generating apparatus of the invention includes: operation history acquisition means for acquiring an operation history of a multi function peripherals in a correspondence with a user; operation frequency analysis means for analyzing an operation frequency at specific timing according to the operation history acquired by the operation history acquisition means; and job template generation means for newly generating a job execution parameter having a high operation frequency on an operation screen as a job template button according to an analysis result by the operation frequency analysis means.

In addition, an automatic job template generation method of the invention is an automatic job template generation method for automatically generating a job template in allowing a multi function peripherals to execute a job, including the steps of: acquiring an operation history of a multi function peripherals in a correspondence with a user; analyzing an operation frequency at specific timing according to the operation history acquired in the step of acquiring the operation history; and newly generating a job execution parameter having a high operation frequency on an operation screen as a job template button according to an analysis result in the step of analyzing the operation frequency.

DESCRIPTION OF THE DRAWINGS

FIG. 13 is a view showing an example of the setting screen of an agent parameter in the scan template;

FIG. 22 is a view showing an example of history data accumulated in an MFP history storage 215 of FIG. 2; and FIG. 23 is a view showing an example of job template data.

DESCRIPTION OF THE EMBODIMENTS

Hereinafter, an embodiment of the invention will be described in detail with reference to the drawings.

Figure 1:
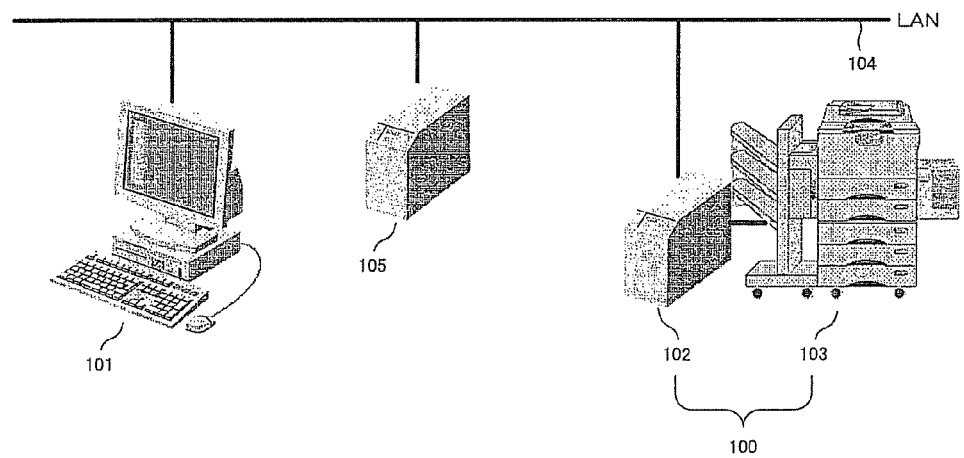
FIG. 1 is a view showing the configuration of the overall system to achieve an automatic job template generating apparatus according to one embodiment of the invention.

FIG. 1 is a view showing the configuration of an overall system to implement an automatic job template generating apparatus of the invention.

Referring to FIG. 1, an MFP (Multi Function Peripherals) 100 formed of a digital copying machine 103 and a controller 102 that controls the scan capability and the print capability of the digital copying machine 103, a client PC 101 capable of providing a print instruction by launching an application and setting the controller by launching a Web client, and a file server 105 are linked to a network, such as a LAN 104.

Figure 2:
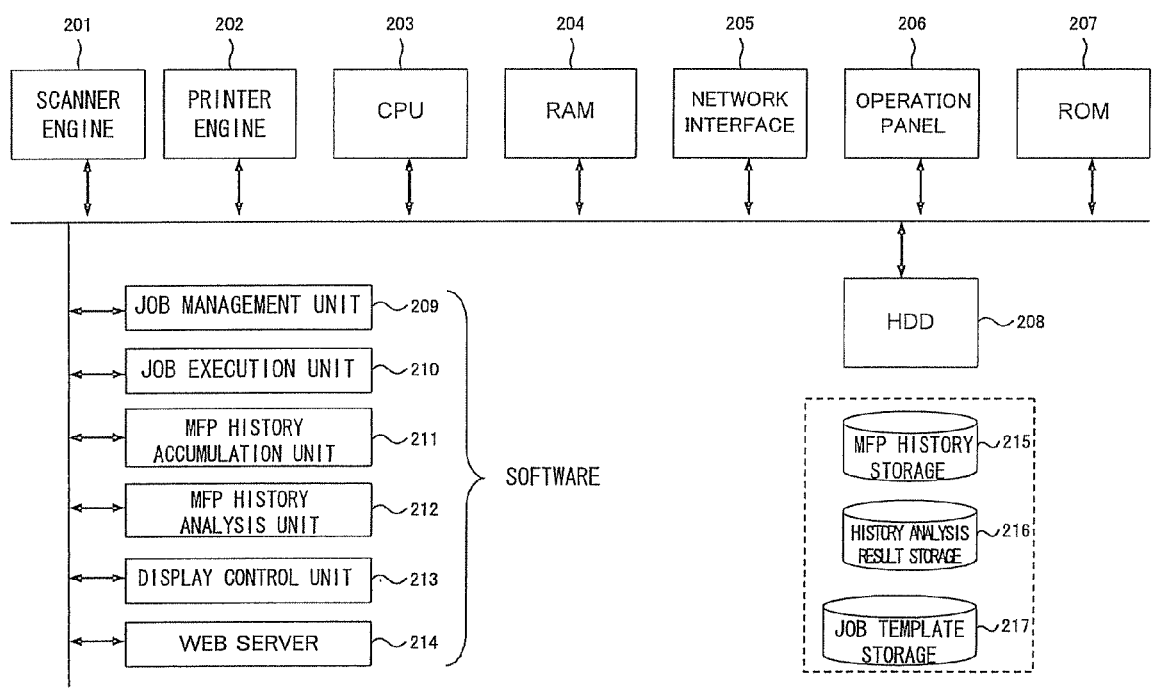
FIG. 2 is a block diagram showing the module configuration of a digital copying machine 103 in a multi function peripherals (MFP) 100 shown in FIG. 1.
Figure 3:
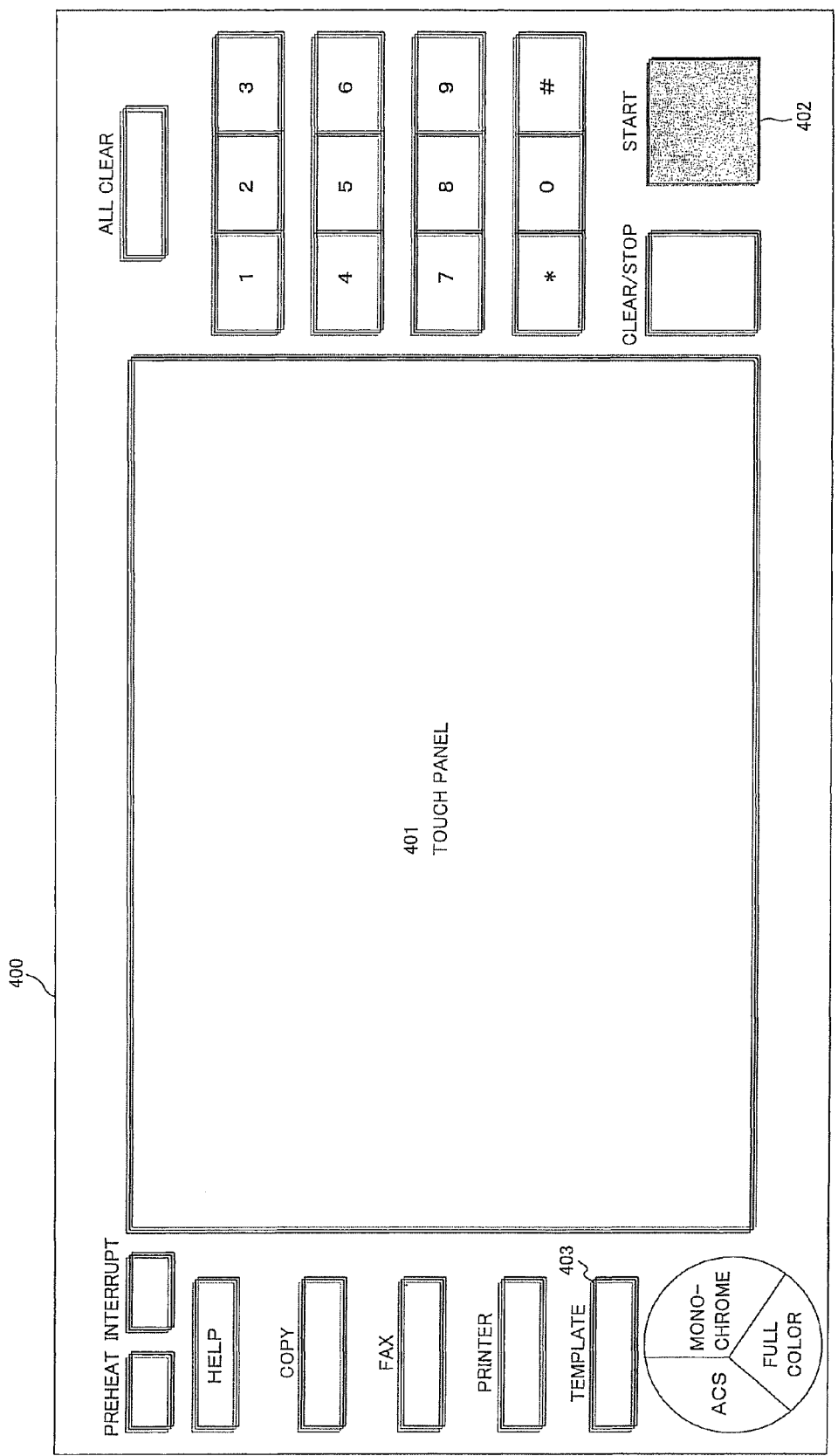
FIG. 3 is a view showing an operation unit of the digital copying machine 103 shown in FIG. 1.

Although it is not particularly shown in the drawing, the digital copying machine 103 is formed of a scanner that scans a paper original document to acquire image data in a digital format, a printer that prints the image data on a sheet of paper, an operation unit as shown in FIG. 3, a CPU that controls the entire apparatus as shown in FIG. 2, a memory and an HDD to store a control program and management data, and a communication unit to establish a connection to the controller.

The digital copying machine 103 has a copy capability from a paper original document to a sheet of paper, and because this copy capability is the same capability in a copying machine in the related art, the description thereof is omitted herein.

Also, the controller 102 has a network print capability. The controller 102 therefore receives a print command described in the page description language (PDL) from document creation software running on the client PC 101, generates image data from PDL, and transfers the image data to the digital copying machine 103. The digital copying machine 103 has a print capability to print the image data transferred from the controller 102 onto a sheet of paper. Because this print capability is the same as that of a typical network printer, the description thereof is omitted herein.

The controller 102 has an MFP capability. The controller 102 therefore performs scanning through operations on a control panel of the display digital copying machine 103, and is able to perform data transfer, trimming, rotation, and the like for the scanned image data to be edited and processed on the client PC 101.

Also, the controller 102 has an interface, such as a network TWAIN, so that reference can be made to information of various kinds over the network via the LAN 104.

FIG. 2 is a block diagram showing the module configuration of the digital copying machine 103 in the multi function peripherals (MFP) 100 shown in FIG. 1. The interior of the digital copying machine 103 is formed of a scanner engine 201, a printer engine 202, a CPU 203, a RAM 204, a network interface 205, an operation panel 206, a ROM 207, and an HDD 208.

The scanner engine 201 is a module that performs a scan on a paper original document, and the printer engine 202 is a module that performs printing of scanned image and characters. Also, the CPU 203, the RAM 204, the ROM 207, and the network interface 205 are hardware to perform system control of the digital copying machine 103.

The operation panel 206 is a module that provides a user interface by controlling the control panel of the digital copying machine 103. The HDD 208 is a hard disc to accumulate scanned image data and print data to be printed.

As is shown in FIG. 2, regarding the software configuration of the digital copying machine 103, it is formed of a job management unit 209, a job execution unit 210, an MFP history accumulation unit 211, an MFP history analysis unit 212, a display control unit 213, an Web server 214, an MFP history storage 215, a history analysis result storage 216, and a job template storage 217.

The job management unit 209 is a module that manages a copy job, a scanner job, a print job, and so forth by controlling the job execution unit 210. The job execution unit 210 is a module that performs control for respective jobs to be executed actually. The MFP history accumulation unit 211 is a module that acquires and saves an operation history and an image history. The MFP history analysis unit 212 is a module that performs analysis of the operation history and the image history. The display control unit 213 is a module that performs control of a display on the operation panel 206. The Web server 214 is a server module in the HTTP protocol.

Also, the MFP history storage 215 is a storage to store the history information of the MFP 100. The history analysis result storage 216 is a storage to accumulate the analysis result of the history of the MFP 100. The job template storage 217 is a storage that saves the setting information of the job template.

FIG. 3 is a view showing the operation unit of the digital copying machine (color digital copying machine) 103 shown in FIG. 1. Referring to FIG. 3, a control panel 400 of the operation unit is formed of a portion called hard keys (preheat key, interrupt key, help key, copy key, fax key, printer key, template key 403, all clear key, numerical keypad, clear and stop key, and start key 402) and a touch panel 401.

Referring to FIG. 3, in order to provide the color copy capability and the color scan capability, a hard key to switch among the ACS mode, the monochrome mode, and the full-color mode is shown. Herein, by depressing the template key 403, it is possible to make a switch to the template user interface (template U1).

Figure 4:
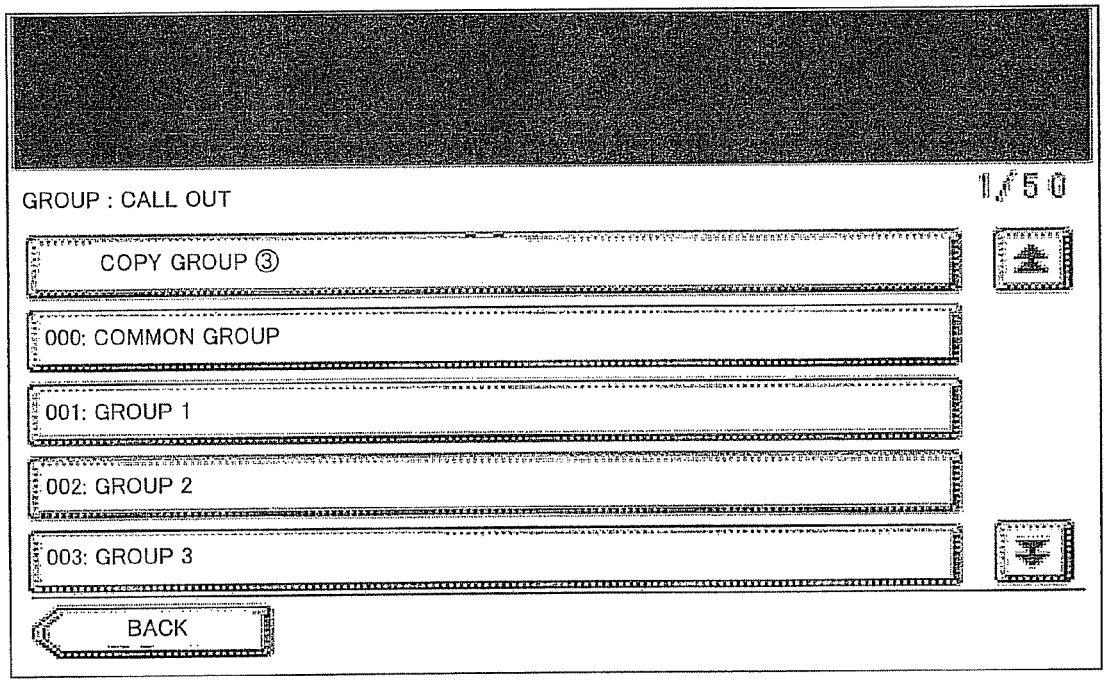
FIG. 4 is a view showing an example of a job template group screen.

FIG. 4 through FIG. 10 show examples of images displayed on the touch panel 401 of FIG. 3. FIG. 4 is a view showing an example of a job template group screen.

The job template is integrated under the concept of groups, and one group is made of plural job templates. Numbers are assigned to groups in order, and the groups displayed on the initial screen are limited to several from the restriction of the display performance of the touch panel (in the example of FIG. 4, five groups are shown per screen).

To reach the desired group number, the user has to scroll the screen step by step.

Figure 5:
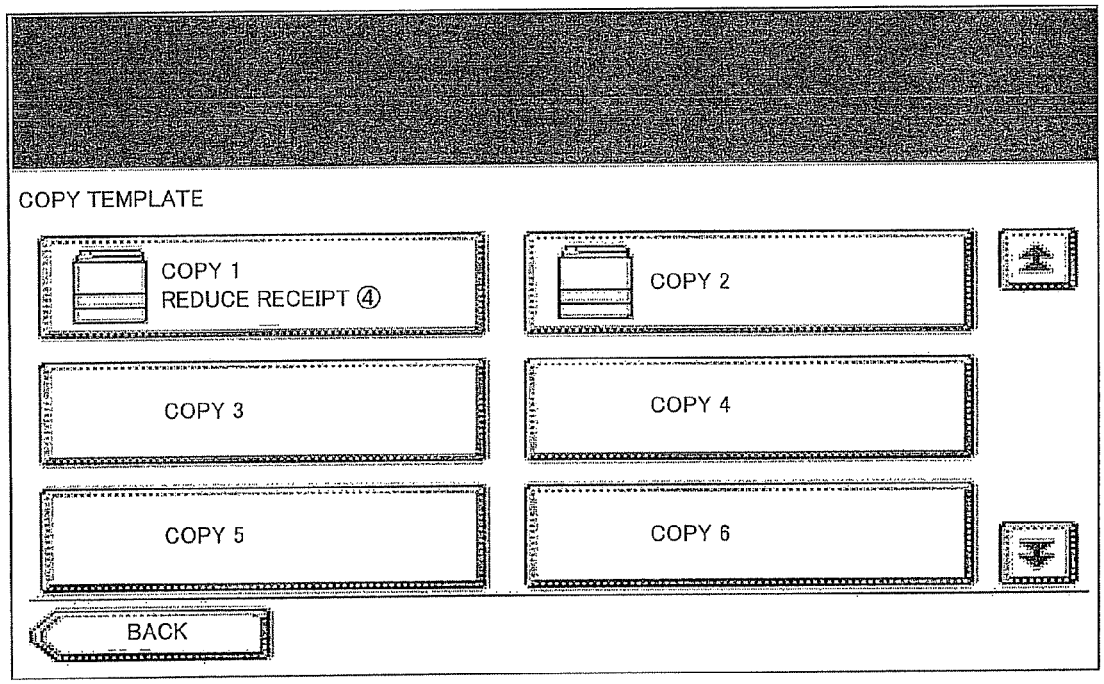
FIG. 5 is a view showing an example of a copy template screen.

FIG. 5 is a view showing an example of a copy template screen. When any one group among group icons on the screen of FIG. 4 is selected, the screen undergoes transition to the copy template screen of FIG. 5 corresponding to the selected group. For example, when a "copy group" icon is selected in FIG. 4, the copy template screen of FIG. 5 is displayed.

Numbers are assigned to the template icons in FIG. 5 in order, and they are disposed sequentially from the initial screen. In a case where the number assigned to the template icon the user wishes to operate is large, the user is able to switch the screens until the desired template icon is displayed by depressing the scroll icon several times.

Figure 6:
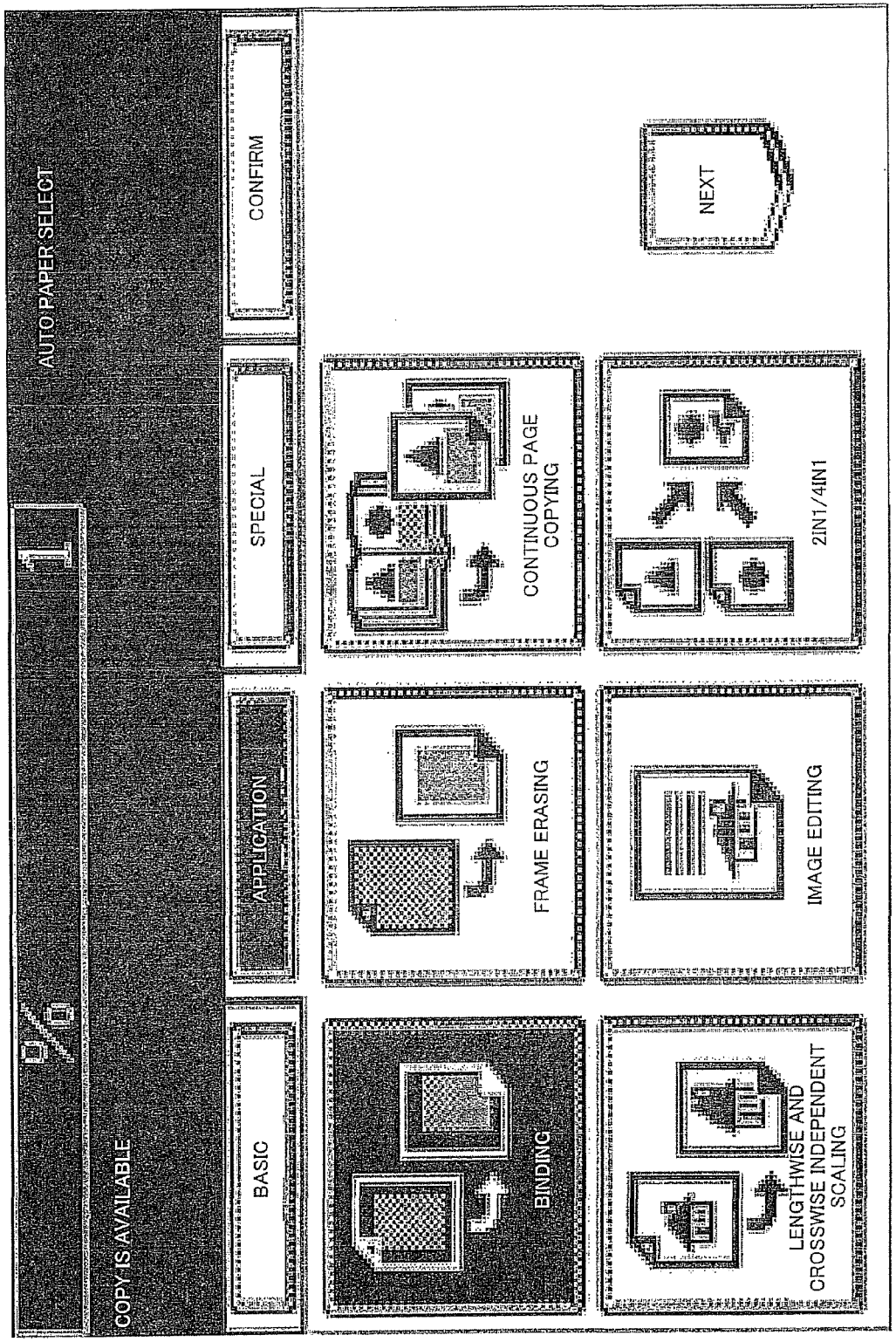
FIG. 6 is a view showing an example of a copy UI screen.

When any one of the template icons is selected on the copy template screen of FIG. 5, the screen undergoes transition to a screen of FIG. 6 corresponding to the selected template icon.

FIG. 6 is a view showing an example of a copy UI screen. In the copy UI screen shown in FIG. 6, the icons are displayed reversely according to the item set by the template (for example, the scan settings and the finishing settings). FIG. 6 shows the template settings when the "binding" capability is selected. In this state, an original document is placed on the document glass and the operation of the copy job starts when the start key 402 is depressed on the control panel 400 of FIG. 3.

Figure 7:
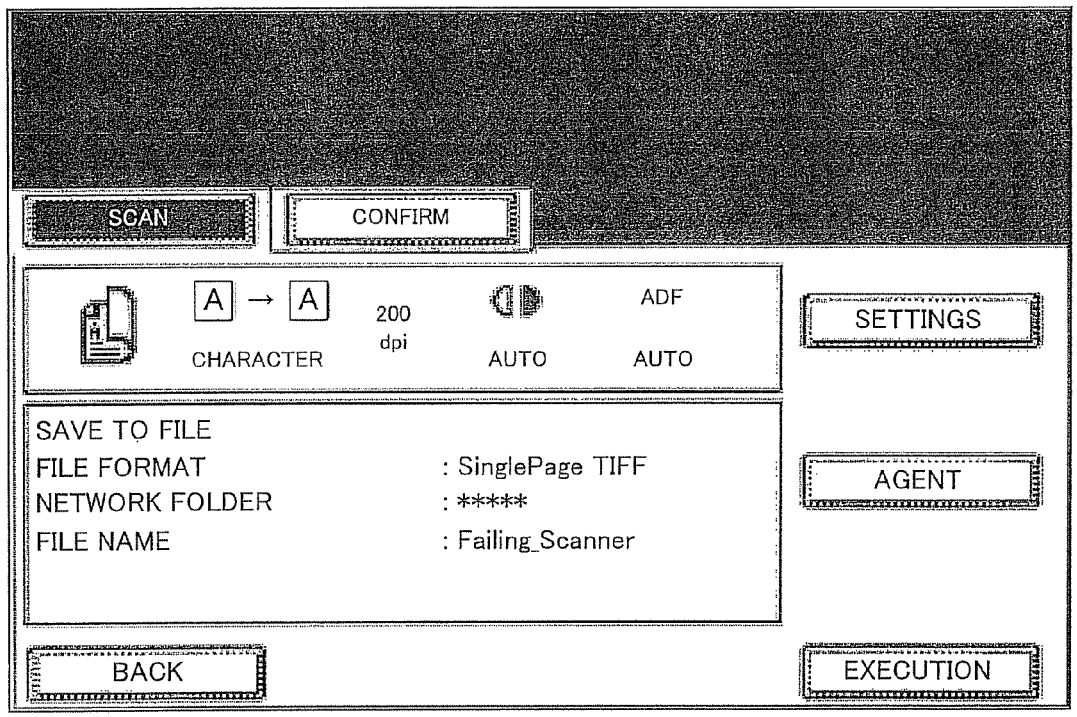
FIG. 7 is a view showing an example of a scan UI screen.

FIG. 7 is a view showing an example of the scan UI screen. When a scan template is selected on the copy template screen of FIG. 5, the screen undergoes transition to the screen of the scan UI shown in FIG. 7. In the scan UI, a summary screen is displayed according the item set in the template (for example, the scan settings and the agent settings).

Referring to FIG. 7, the corresponding scan job starts when the "execution" icon or the start key 402 on the control panel 400 of FIG. 3 is depressed.

Figure 8:
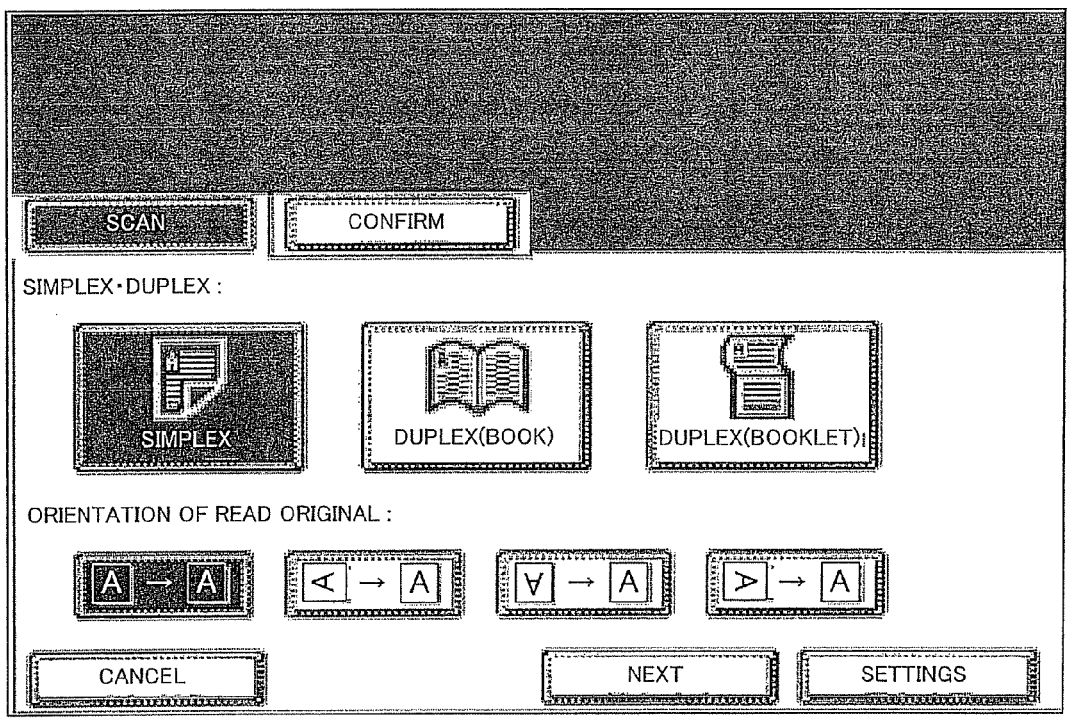
FIG. 8 is a view showing a scan parameter setting screen (first)

Also, referring to FIG. 7, in a case where the "settings" icon is depressed, the screen undergoes transition to a screen for the scan parameter settings of FIG. 8 for the scan settings to be performed.

Figure 9:
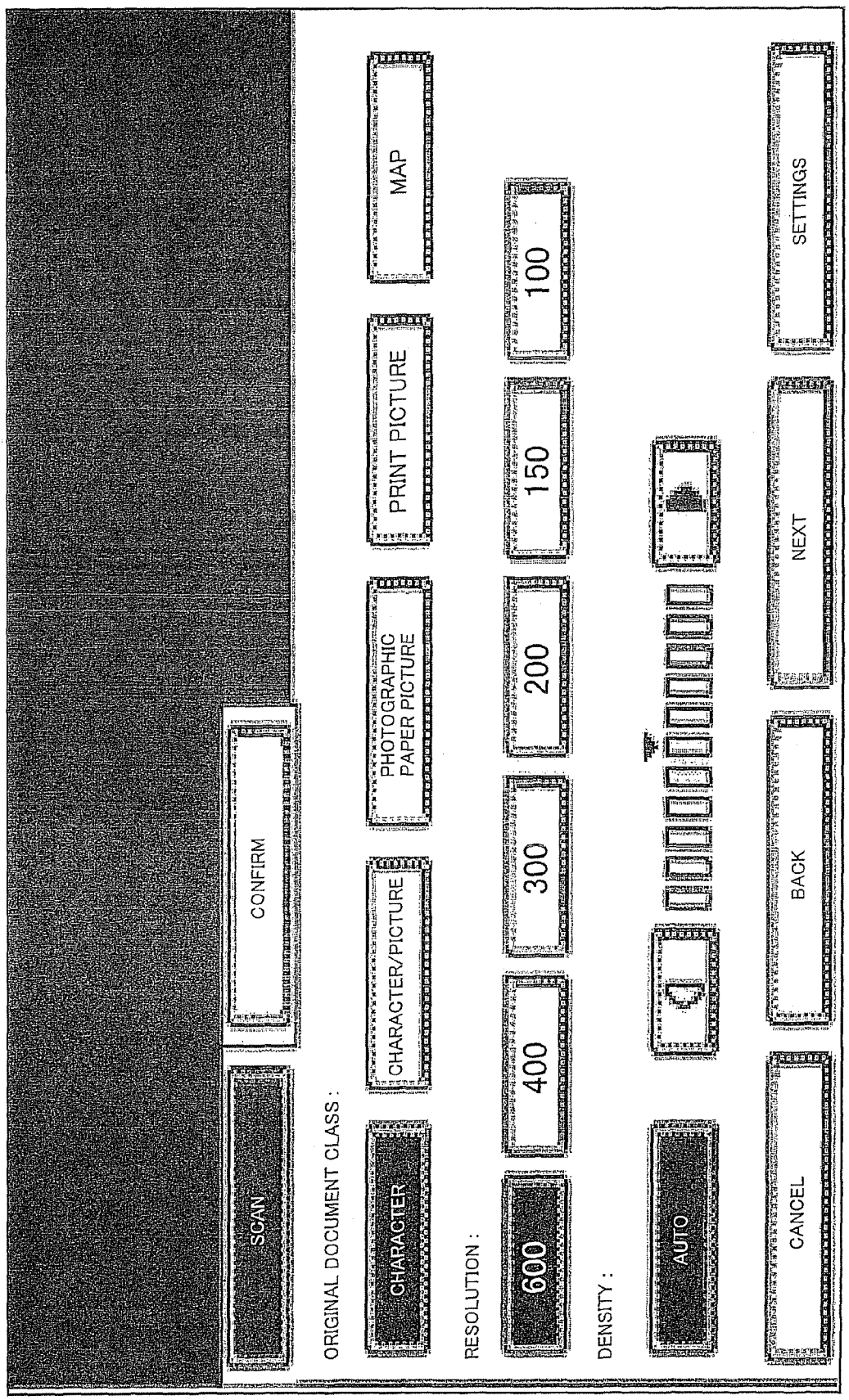
FIG. 9 is a view showing a scan parameter setting screen (second)
Figure 10:
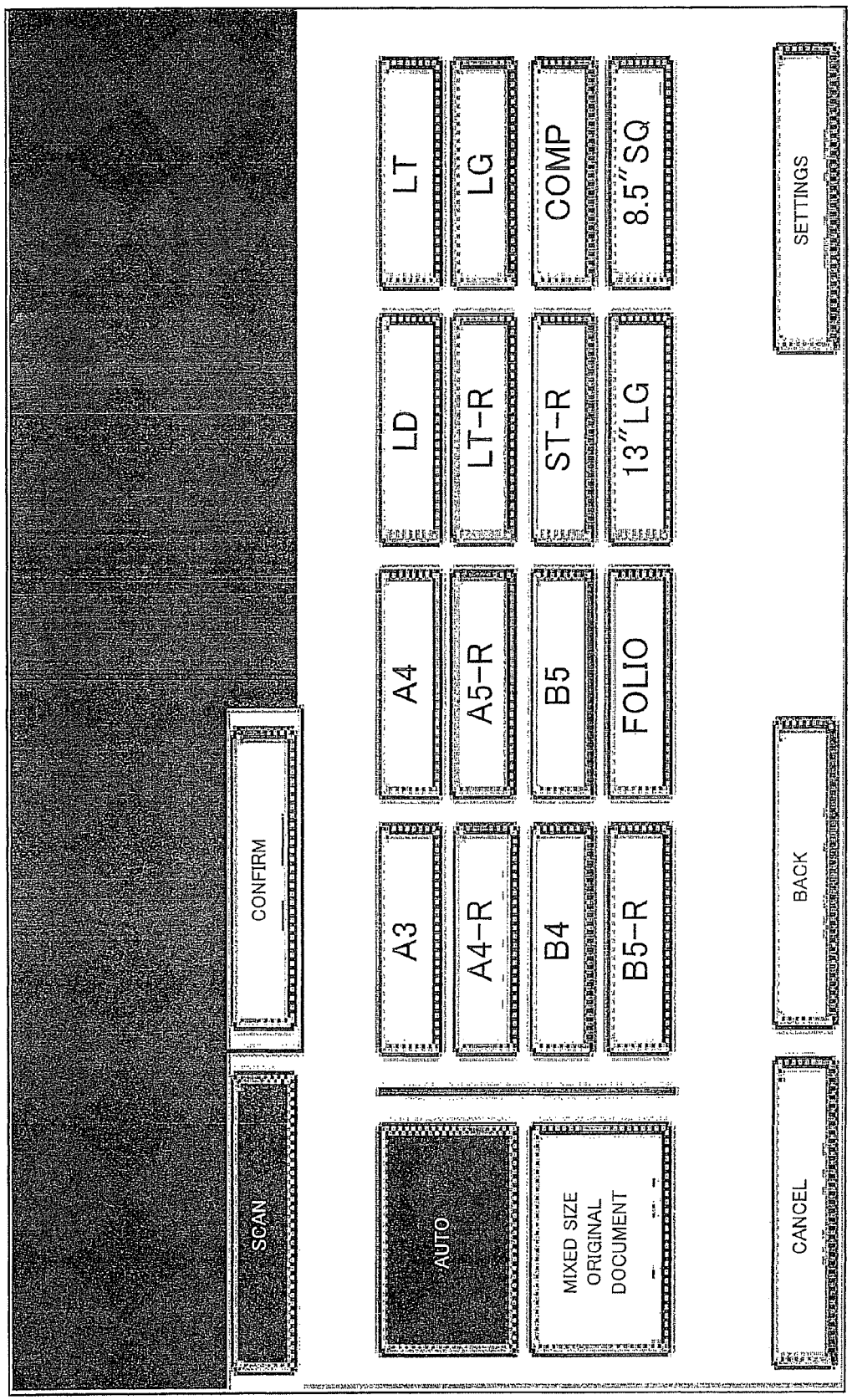
FIG. 10 is a view showing a scan parameter setting screen (third)

FIG. 8 through FIG. 10 are views showing some examples (first through third) of the scan parameter setting screen. Herein, scan parameters that user can specify from the touch panel 401 of FIG. 3 are those relating to duplex or simplex (Single, Book, or Tablet), rotation, a document type, resolution, exposure, and an original size.

Figure 11:
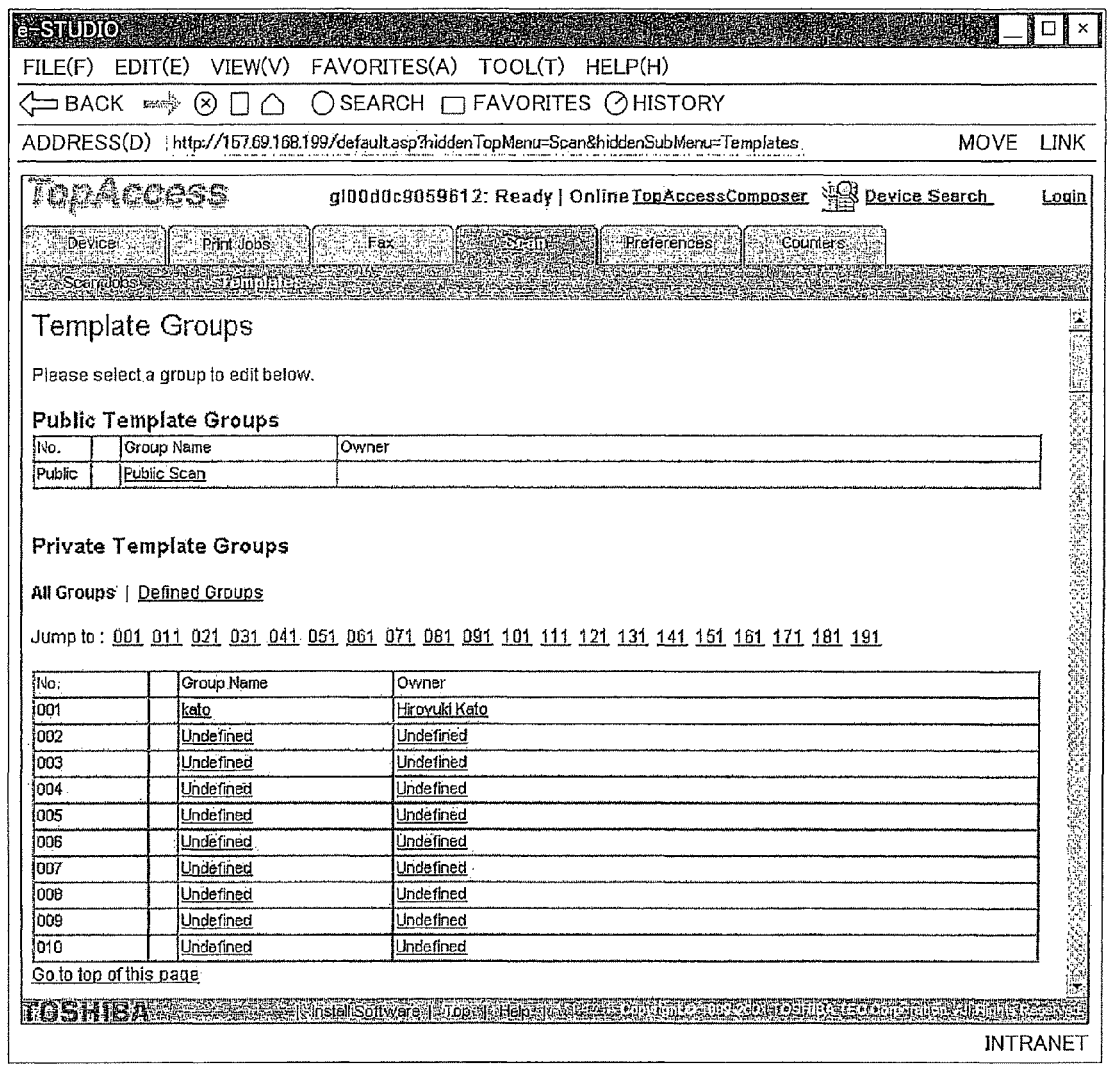
FIG. 11 is a view showing an example of a Web screen for the scan group settings.
Figure 12:
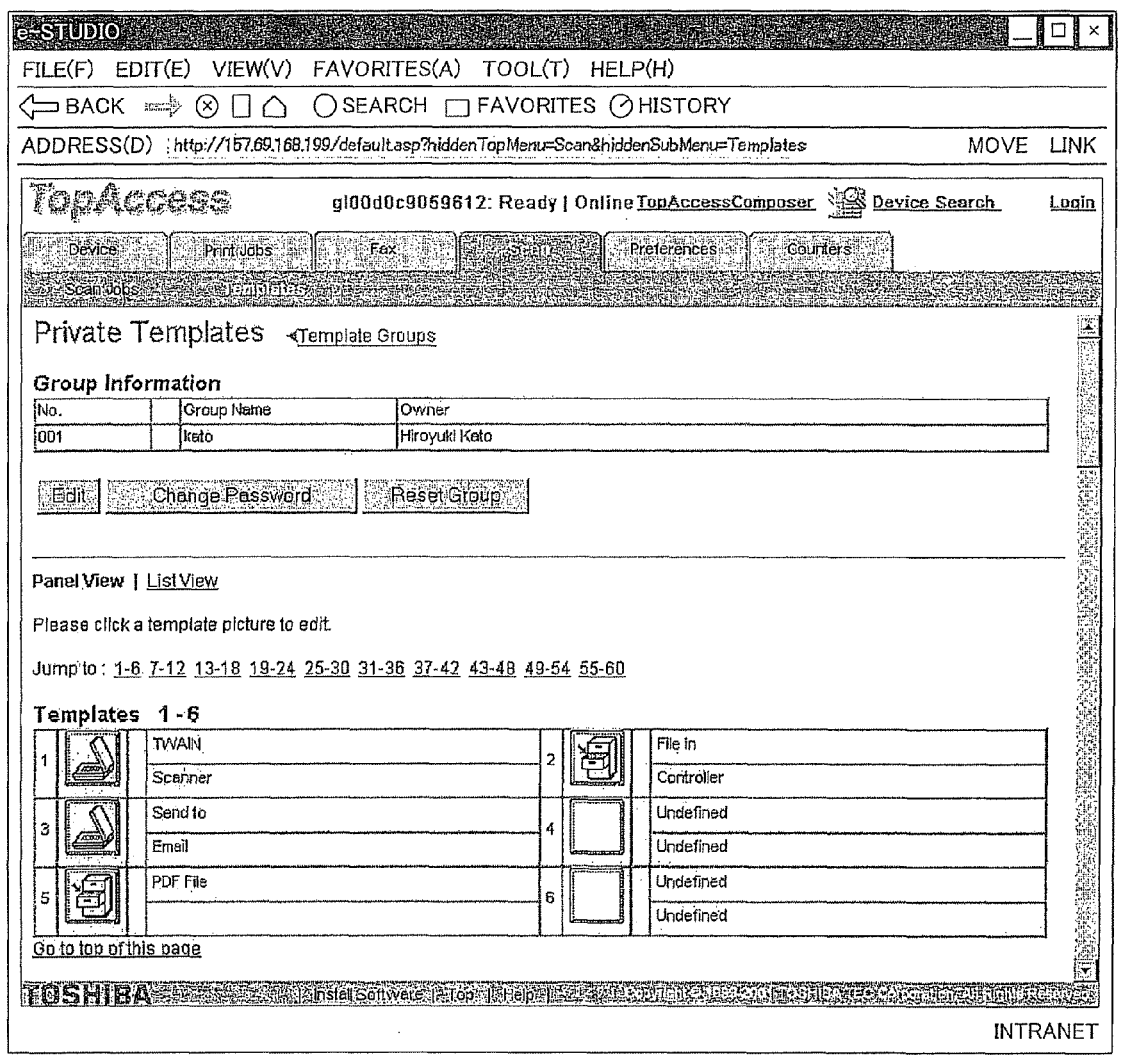
FIG. 12 is a view showing an example of a Web screen of a scan template.

FIG. 11 through FIG. 13 show the setting screens of the scan template. FIG. 11 is a view showing an example of a Web screen for the scan group settings. On the Web screen for the scan group settings in FIG. 11, the job template is generated, and settings of the template groups are performed. In this instance, numbers are assigned to respective groups in order and they are displayed in numerical order.

FIG. 12 is a view showing an example of a Web screen of the scan template. On the Web screen of FIG. 12, the settings of the scan template are performed. It should be noted that numbers are assigned to respective templates in order and they are displayed in numerical order.

FIG. 13 is a view showing an example of the setting screen of the agent parameter in the scan template. The setting screen of the agent parameter of FIG. 13 shows an example of the screen to perform the agent settings in a case where a Send to Email agent is selected.

Figure 14:
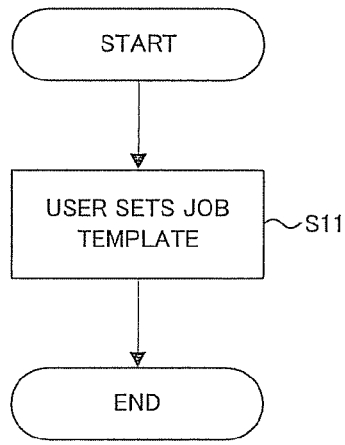
FIG. 14 is a flowchart showing the procedure normally performed to set a job template.

FIG. 14 is a flowchart showing the procedure to set the job template normally performed in the MFP. The user performs the settings of the job template according to the procedure of the flowchart shown in FIG. 14 using the setting screens of the scan template as shown in FIG. 11 through FIG. 13. For example, the user sets a desired job template on the Web screen for the scan group settings of FIG. 11 (Step S11), and executes the desired job.

Figure 15:
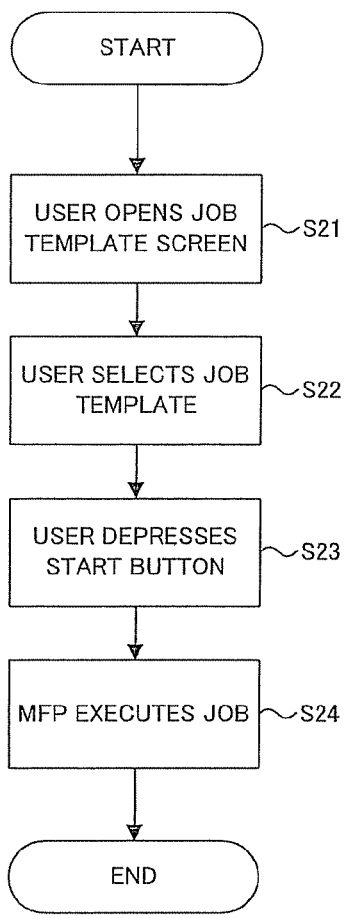
FIG. 15 is a flowchart showing the flow normally performed to execute a job using the job template.

FIG. 15 is a flowchart showing the flow normally performed by the MFP to execute a job using the job template. Referring to FIG. 15, the user first opens a desired job template screen by the client PC 101 (Step S21). The job template screen means, for example, screens like the job template group screen shown in FIG. 4 and the copy template screen shown in FIG. 5.

The user then selects the desired job template (Step S22). For example, when he depresses a given job template button among those on the copy template screen of FIG. 5, the job execution parameter registered in the job template button is read in. When the user depresses the start button 402 on the control panel 400 of FIG. 3 (Step S23), the MFP executes the desired job according to the job execution parameter thus read in (Step S24).

Figure 16:
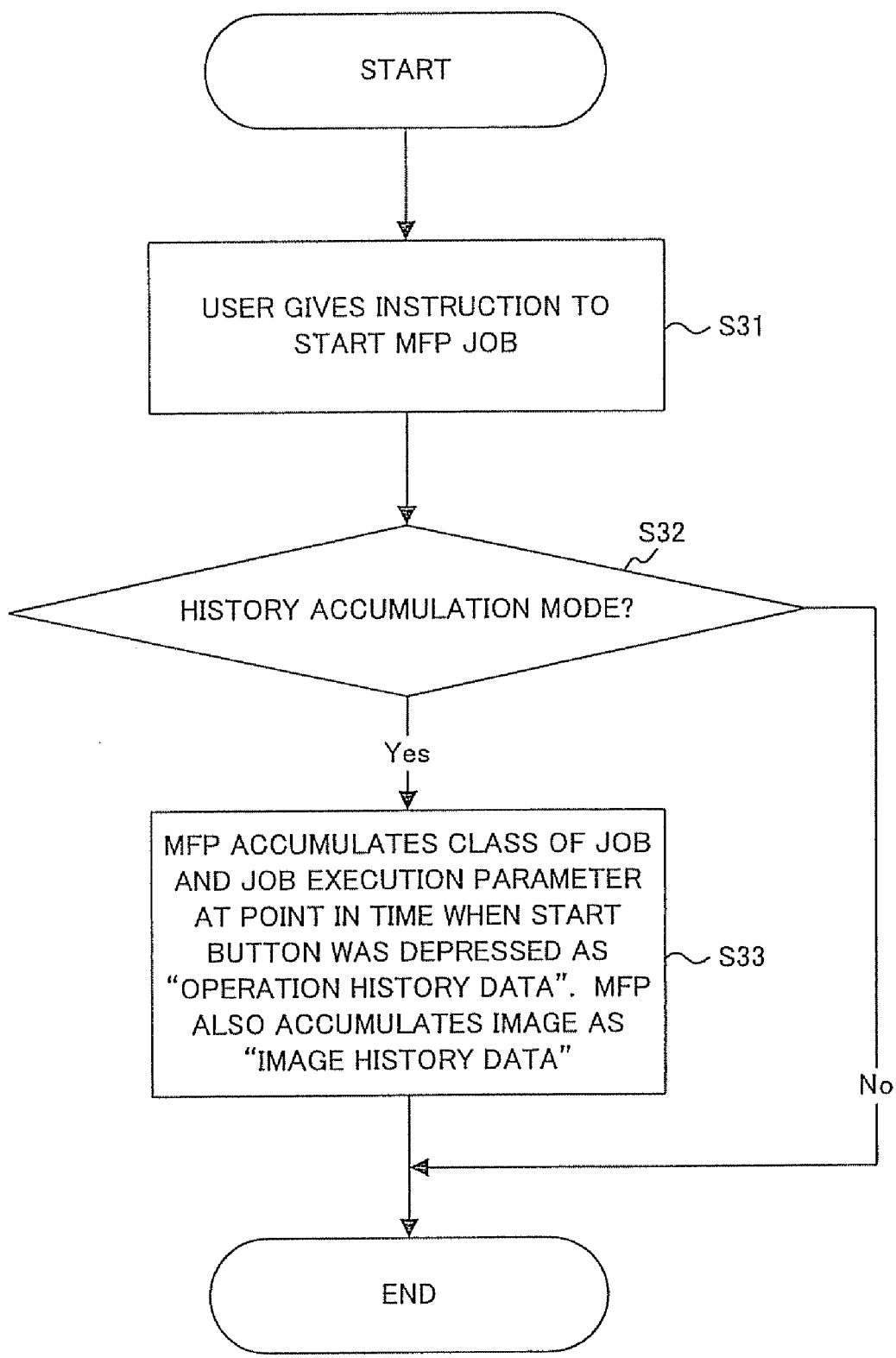
FIG. 16 is a flowchart showing the flow of operations of an automatic job template generating apparatus in the MFP according to the embodiment of the invention to accumulate an operation history and an image history.

FIG. 16 is a flowchart showing the flow of operations of the automatic job template generating apparatus in the MFP of this embodiment to accumulate the operation history and the image history.

Initially, the user gives an instruction to start the MFP job by depressing the start button 402 on the control panel 400 shown in FIG. 3 (Step S31).

Subsequently, the user determines whether the apparatus is in a mode to accumulate the operation history and the image history (hereinafter, they are collectively referred to simply as the history) (Step S32). When the apparatus is in the mode to accumulate the history (Step S32, Yes), the MFP accumulates, as the operation history data, the class of the job at the point in time when the start button was depressed (for example, Copy, Scan to File, Scan to Email, etc.) and the job execution parameter (for example, 10 copies, Duplex, Auto Exposure, Auto Color Select mode, etc.). Also, it accumulates an image obtained by executing the job as the "image history data" (Step S33).

Figure 20:
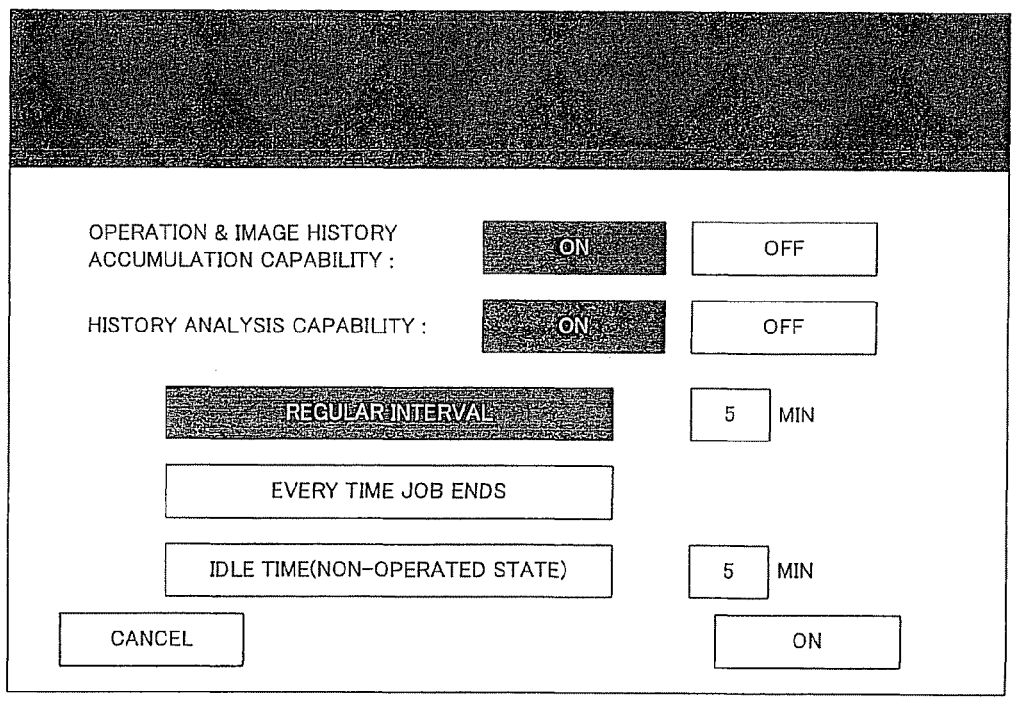
FIG. 20 is a view showing the configuration of a setting screen (first) used to set an automatic job template generation capability.

In order to set the apparatus in the mode to accumulate the history, the settings for this purpose are performed on a setting screen (first) for automatic job template generation of FIG. 20.

Figure 17:
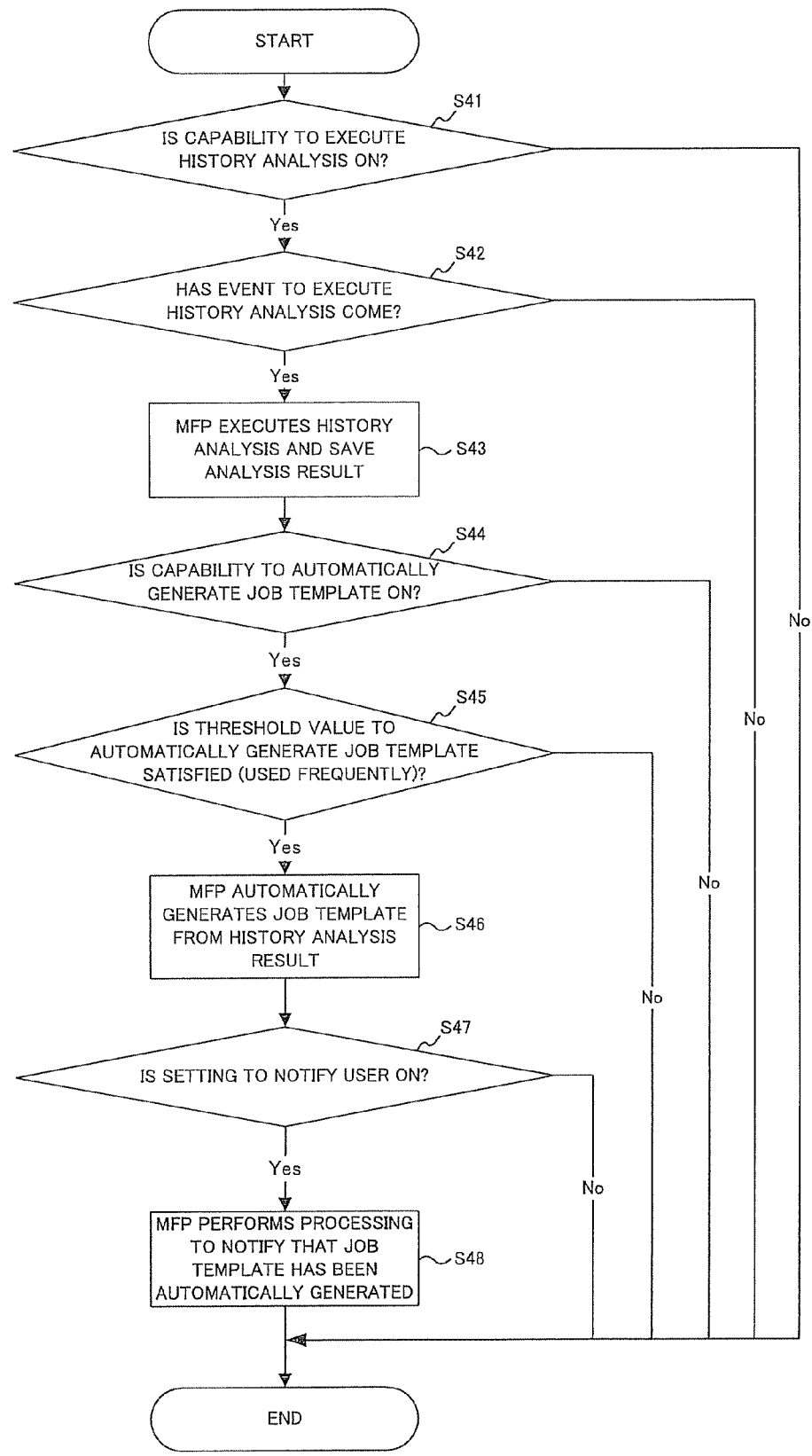
FIG. 17 is a flowchart showing the flow of operations of the automatic job template generating apparatus in the MFP according to the embodiment of the invention to perform history analysis and automatic job template registration processing.

FIG. 17 is a flowchart showing the flow of operations of the automatic job template generating apparatus in the MFP of this embodiment to perform history analysis and automatic job template registration processing.

Initially, the MFP checks whether the capability to execute history analysis is ON (Step S41). When the capability to execute the history analysis is ON (Step S41, Yes), the MFP checks whether an event of the history analysis execution has come (Step S42).

There are several events as the event of the history analysis execution, for example, as are shown in the setting screen (first) for automatic job template generation of FIG. 20, events to execute history analysis at regular intervals, to execute history analysis each time a job ends, to execute history analysis when an idle time (that is, non-operated state) has continued over a certain time. When any one of these events comes in Step S42 (Step S42, Yes), the MFP executes the analysis of the history and saves the analysis result (Step S43).

When the MFP executes the history analysis, it is able to identify individual users by recognizing the user (corresponding to an individual or a group) who operated the client PC 101 through an access to the MFP from the screen displayed on the Web browser on the client PC 101 shown in FIG. 11 through FIG. 13.

To be more concrete, examples are a case where the user is identified by letting him input the user ID and the password on the screen, a case where he is identified by means of an authentication device, such as an IC card, and a case where he is identified by means of biometrics.

As a result, the job templates are generated or updated for each individual or group and then managed.

Subsequently, the MFP checks whether the capability to automatically generate the job template is ON (Step S44). When the capability to automatically generate the job template is ON (Step S44, Yes), the MFP checks whether a threshold value to automatically generate the job template is satisfied (whether the capability to automatically generate the job template is used frequently) (Step S45).

The threshold value means, for example, a case where the capability is used by a particular user three times or more in one day or a case where the capability is used by a particular user group ten times or more in one week.

Herein, in a case where it is determined that the capability to automatically generate the job template is used frequently (Step S45, Yes), the MFP automatically generates the job template according to the analysis result of the history (Step S46).

The MFP then checks whether the capability to notify the user that the job template has been automatically generated is ON (Step S47), and when the capability to notify the user that the job template has been automatically generated is ON (Step S47, Yes), the MFP executes the processing to notify the user that the job template has been automatically generated (Step S48).

Figure 21:
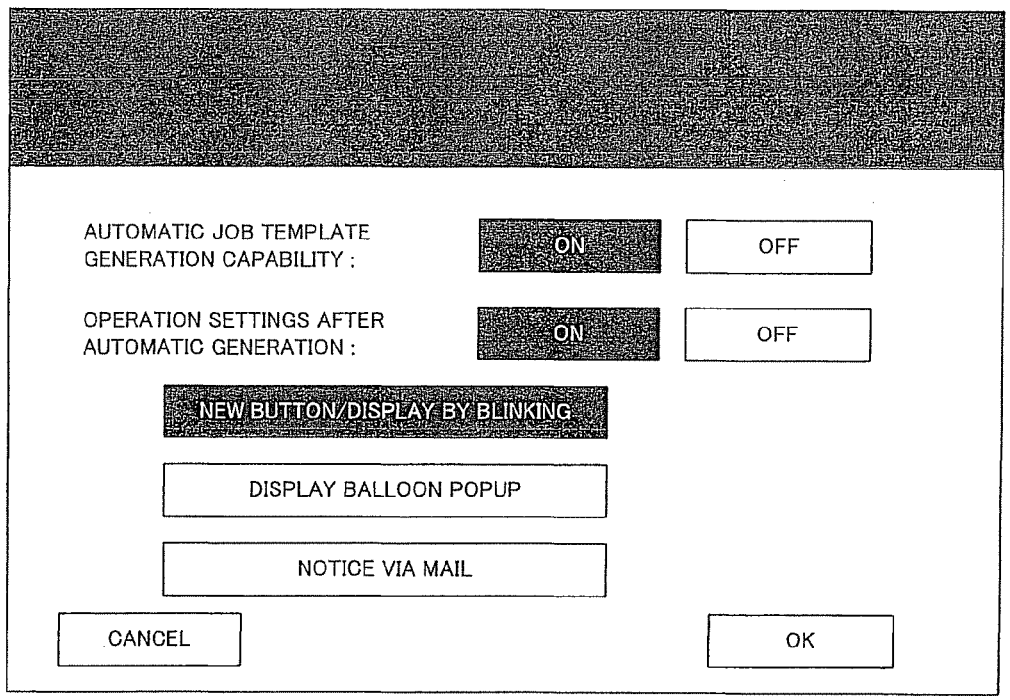
FIG. 21 is a view showing the configuration of a setting screen (second) used to set the automatic job template generation capability.

The processing to notify that the job template has been automatically generated is, for example, the processing to display a newly generated job template button by blinking as is shown on the setting screen of the automatic job template generation capability of FIG. 21. In this instance, the newly generated job template button is displayed in a color different from colors of the other template buttons. Also, a balloon popup indicating the description of being a newly generated button is displayed in close proximity to the newly generated job template. Further, it is possible to provide a capability to notify the manager and the user that the job template button has been newly generated via an e-mail.

Figure 18:
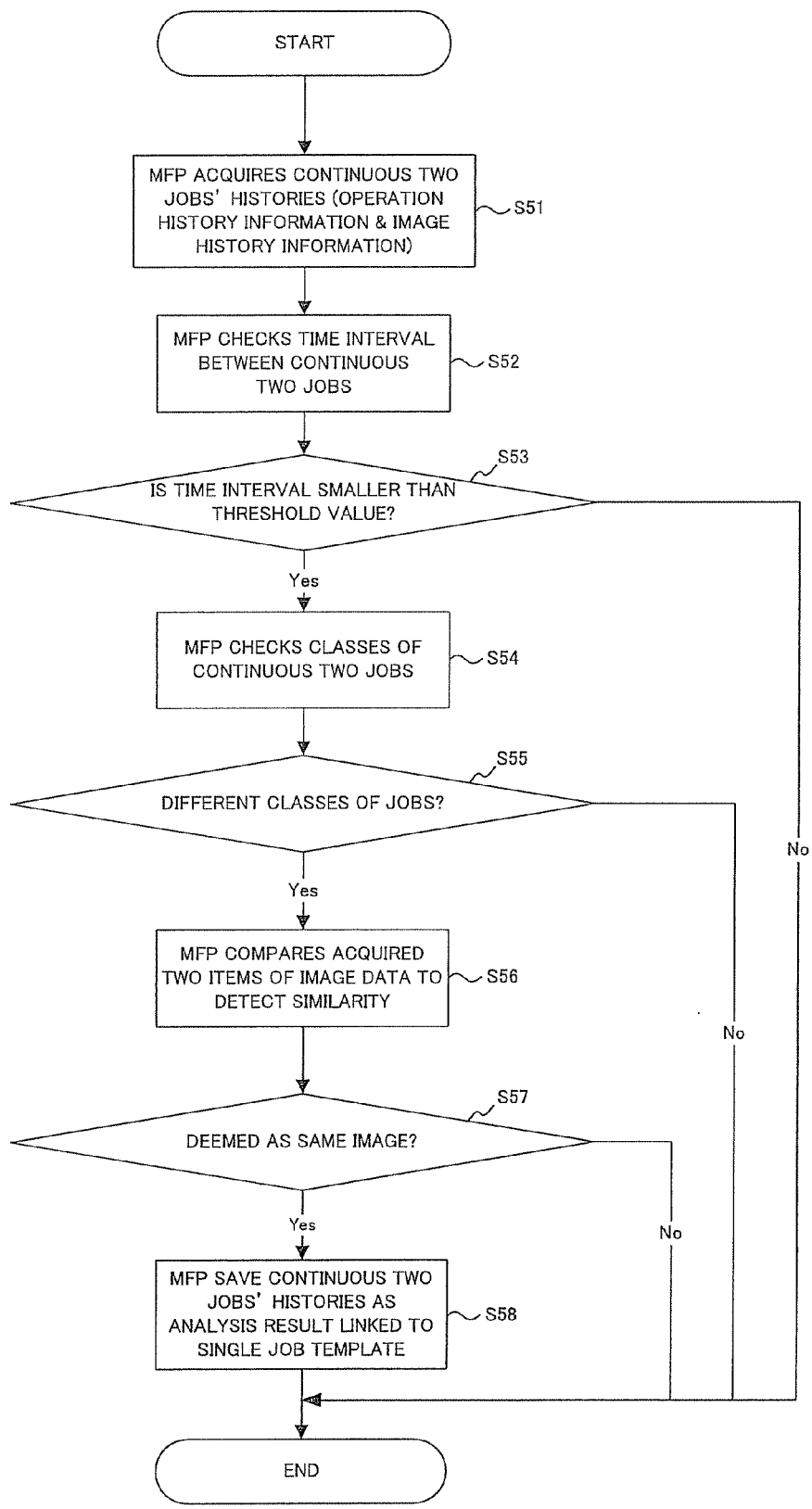
FIG. 18 is a flowchart showing the flow of operations of the automatic job template generating apparatus in the MFP according to the embodiment of the invention to generate a job template from an image history.

FIG. 18 is a flowchart showing the flow of operations of the automatic job template generating apparatus in the MFP of this embodiment to generate the job template from the image history.

Initially, the MFP acquires continuous two jobs' histories (operation history information and image history information) sequentially from the history data saved in the MFP history storage 215 of FIG. 2 (Step S51).

Subsequently, the MFP checks a time interval between the continuous two jobs (Step S52). Herein, the MFP checks whether the time interval between the continuous two jobs is smaller than a pre-set threshold value (for example, a value corresponding to 30 sec) (Step S53), and in a case where the time interval is smaller than the threshold value (the time interval is short) (Step S53, Yes), the MFP checks the classes of the continuous two jobs (for example, Copy, Scan to File, Scan to Email, etc.) (Step S54).

Herein, the MFP determines whether the classes of the continuous two jobs are different (Step S55), and in a case where the classes of the continuous two jobs are different (Step S55, Yes), the MFP compares the acquired two items of the image data to check the similarity of these two items of the image data (Step S56).

Further, in determining whether the two images are deemed as being the same image (Step S57), in a case where the two images are deemed as being the same image (Step S57, Yes), the MFP saves the continuous two jobs' histories in the history analysis result storage 216 of FIG. 2 as the analysis result linked to a single job template (Step S58).

Figure 19:
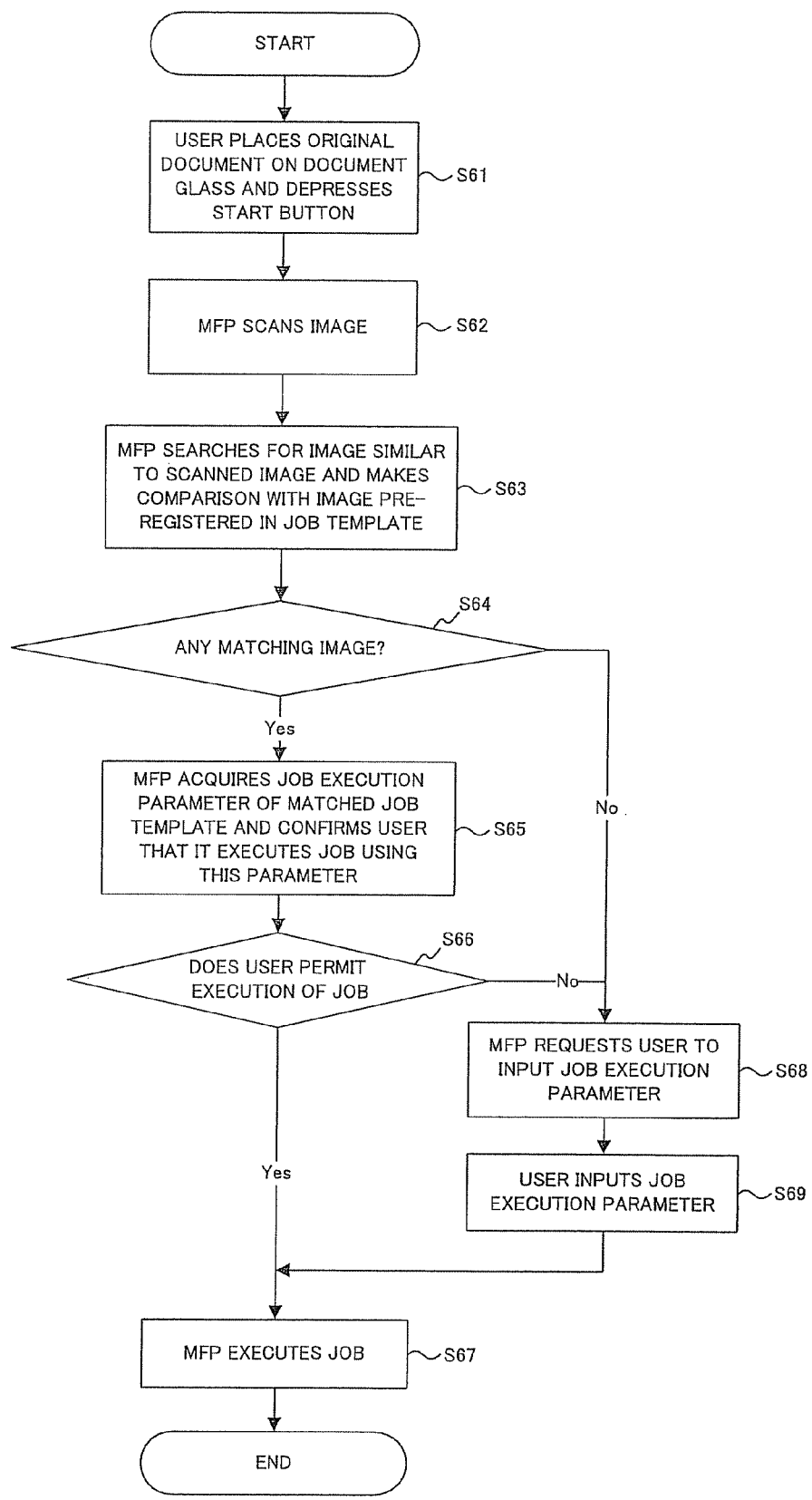
FIG. 19 is a flowchart showing the flow of operations of the automatic job template generating apparatus in the MFP according to the embodiment of the invention to automatically select a job execution parameter that matches the job template.

FIG. 19 is a flowchart showing the flow of operations of the automatic job template generating apparatus in the MFP of this embodiment to automatically select the job execution parameter that matches the job template.

Initially, the user places an original document on the ADF (Automatic Document Feeder) or the document glass and depresses the start button (Step S61). Subsequently, the MFP performs a scan on the image using the default job execution parameter (Step S62). Further, the MFP compares the scanned image with the image registered in advance in the job template to perform a search for a similar image (Step S63).

Herein, in the comparison result between the scanned image and the image registered in the job template (Step S64), in a case where there is a matching image in the job template (Step S64, Yes), the MFP acquires the job execution parameter of the matched job template, and confirms the user that the job is executed using this parameter (Step S65).

Subsequently, the MFP determines whether the user permits the job execution in responding to the confirmation from the MFP (Step S66), and in a case where the user permits the job execution (Step S66, Yes), the MFP executes the desired job using the execution parameter with which the execution is permitted (Step S67).

Meanwhile, in a case where there is no matching image in the job template in Step S64 (Step S64, No), and in a case where the user does not permit the job execution in Step S66 (Step S66, No), the MFP requests the user to input a job execution parameter to let the user input the parameter (Step S68). Subsequently, the user inputs the job execution parameter (Step S69) and depresses the start button 402 on the control panel 400 of FIG. 3, upon which the MFP executes the desired job (Step S67).

FIG. 20 is a view showing the configuration of the setting screen used to set the automatic job template generation capability. The setting screen has a portion to set ON and OFF of the capability to accumulate the operation history and the image history and a portion to set ON and OFF of the history analysis capability.

Also, in a case where the history analysis capability is selected to be ON, it has a timing setting portion that makes it possible to set the timing at which the history analysis is executed. For example, it is possible to arbitrarily opt to perform the history analysis at regular intervals, to perform the history analysis each time a job ends, to perform the history analysis when an idle time (non-operated state) has continued over a certain time, and so forth.

FIG. 21 is a view showing the configuration of the setting screen to set the automatic job template generation capability. This screen has a portion to set ON and OFF the automatic job template generation capability. Also, it has a portion to set options of operations after the automatic generation is performed in a case where the automatic generation is set ON.

For example, it is possible to arbitrarily opt for the settings by which the newly generated job template button is displayed by blinking, the settings by which the newly generated job template button is displayed in a color different from the colors of the other template buttons, the settings by which a balloon popup indicating the description of being a newly generated button is displayed in close proximity to the newly generated job template button, the setting by which a message that the job template button has been newly generated is notified to the manager or the user via an e-mail, and so forth.

FIG. 22 is a view showing an example of the history data accumulated in the MFP history storage 215 of FIG. 2. The history data accumulated in the MFP history storage 215 is made of the operation history and the image history. The history data includes, for example, the date when the job was executed, the place where the job was executed, the execution content of the job (that is, the class of the job or the type of the job), the job execution parameter (for example, in the case of Copy, 10 copies, Duplex, Automatic Exposure, Auto Color Select mode, etc.), data relating to the handled image data, and so forth. The file of the image is saved intact in the MFP history storage 215.

FIG. 23 is a view showing an example of the job template data. The job template data contains attribute information, such as the template group ID, the template ID, the template name, the owner of the template, and the job execution parameter (for example, in the case of Copy, 10 copies, Duplex, Automatic Exposure, Auto Color Select mode, etc.), and the image data and the image file executed in the past are saved intact.

As has been described, in the automatic job template generating apparatus of this embodiment, the operation history acquisition unit (operation history acquisition means) acquires the operation history of the multi function peripherals for each user according to the information accessed to the multi function peripherals on the Web by the processing in Step S42 of FIG. 17. The setting screen of the automatic job template generation in this instance is the screen as shown in FIG. 20.

Also, the operation frequency analysis unit (operation frequency analysis means) analyzes the operation frequency at regular timing according to the operation history acquired by the operation history acquisition unit (operation history acquisition means) by the processing in Step S43 of FIG. 17.

Further, the job template generation unit (job template generation means) newly generates a job execution parameter having a high operation frequency on the operation screen as the job template button according to the analysis result of the operation frequency analysis unit (operation frequency analysis means) by the processing in Step S46 in FIG. 17.

Also, the operation history acquisition unit (operation history acquisition means) acquires the operation history, such as the key input, the class of the job, the job execution parameter, the image history, the job set value at a point in time when the start button was depressed, and the identification information of the operator by the processing in Step S33 of FIG. 16.

Also, the notification unit (notification means) notifies, when the job template generation unit (job template generation means) has newly generated the job template button, the outside (for example, the user) of the information informing such generation by the processing in Step S43 of FIG. 17.

In this instance, as is shown in FIG. 21, the notification unit (notification means) displays the information informing that the job template button has been newly generated by displaying it by blinking or in a color different from the colors of the other job template buttons. Alternatively, the information informing that the job template button has been newly generated is displayed as a balloon popup.

Also, as is shown in FIG. 21, the notification unit (notification means) is able to notify the outside of the information informing that the job template button has been newly generated via an e-mail.

Also, in the automatic job template generating apparatus of this embodiment, the image history save unit (image history save means) saves the image of the executed job as the image history by the processing in Step S51 of FIG. 18.

Further, the time interval determination unit (time interval determination means) determines whether the time interval between the continuous two images saved in the image history save unit (image history save means) is shorter than a specific threshold value by the processing in Steps S52 and S53 of FIG. 18. When the time interval determination unit (time interval determination means) determines that the time interval between the continuous two images in the operation history is shorter than the specific threshold value, the same image determination unit (same image determination means) determines whether the two images are the same image by the processing in Steps S56 and S57 of FIG. 18.

Further, when the same image determination unit (same image determination means) determines that the two images are the same image, the multi-job template button generation unit (multi-job template button generation means) generates a job template button of multiple jobs by integrating two or more operations in the operation history acquired by the operation history acquisition unit (operation history acquisition means) by the processing in Step S58 of FIG. 18. In addition, in the automatic job template generating apparatus of this embodiment, the image history save unit (image history save means) saves the image of the executed job as the image history by the processing in Step S62 of FIG. 19. Also, the similar image determination unit (similar image determination means) determines whether there is a similar image in the past by analyzing the image history saved in the image history save unit (image history save means) by the processing in Steps S63 and S64 of FIG. 19.

When the similar image determination unit (similar image determination means) determines that there is similar image in the past, the job execution unit (job execution means) executes the job using the job execution parameter corresponding to the similar image by the processing in Steps S65, S66, and S67 of FIG. 19.

The embodiment of the invention described above can be summarized as follows.

The automatic job template generating apparatus of this embodiment acquires and analyses the operation frequency according to the operation history of the MFP, and automatically re-locates or newly generates the image configuration or the button at certain (regular) timing according to the analysis result. Also, it automatically sets the default value of each screen to the frequently used default value according to the operation history of the MFP, and this default value is resumed when the user uses the apparatus next time.

Also, the automatic job template generating apparatus of this embodiment automatically sets the default value of the job to the frequently used default value according to the operation history of the MFP, and newly generates a single button (job template button).

Further, when the image configuration is changed automatically to reduce the operation steps, the user is notified that the image configuration has been formed. Also, it is able to display the ranking of the set values by the types of job according to the operation history of the MFP. The job is launched according to this set value ranking.

In other words, the automatic job template generating apparatus of this embodiment enables the user to use the job execution parameter used frequently by the user swiftly by registering the frequently used job execution parameter as a new job template according to the operation history information.

There is a case where the same user uses the job of the same type differently depending on the situation at that point in time. However, even when the user uses the job differently, by automatically generating the frequently used job execution parameter by means of the automatic job template generating apparatus, it is possible to save the user from having to set the job template.

Also, the automatic job template generating apparatus of this embodiment is able to integrate processing executed as two separate jobs so as to automatically register them as a single job template, which is proposed to the user, by saving and analyzing not only the operation history information but also the history information of the image processed by the job.

Accordingly, for example, in contrast to a case in the related art where the user handles two jobs, Copy and Scan to File, using the same original document, it becomes possible to automatically generate a job template of Copy & File, which is proposed to the user. This allows the user to handle two jobs as a single job, which can in turn make the operations simpler by reducing the number of operations.

Further, when the start button is depressed, the job execution parameter is not determined immediately. Instead, the image characteristic of the executed job is analyzed, and in a case where it is detected that the job was executed for a similar image in the past, by executing the job using the job execution parameter used in the past, it is possible to make the operation simpler by the user to select the job template. More specifically, by configuring in such a manner that the automatically generated job template can be selected automatically according to the image characteristic at the time of job execution, it is possible to make the operations by the user to select the job template further simpler.

Further, by saving and analyzing the image history information and by saving the image history information together with the job template, it is possible to automatically set the job execution parameter without the need for the user to input the job execution parameter or to select the job template when launching the job.

Each of the operation history acquisition means, the operation frequency analysis means, and the job template generation means described in the embodiment is applicable to a program that causes a computer to perform the job template generation method described by the flowcharts in the embodiment. This program is recorded in a recording medium readable by the computer, and has the capability to cause the computer to perform the job template generation method of the invention when read by the computer. Regarding such a capability, the embodiment described a case where the capability to implement the invention is pre-recorded in the apparatus. However, the invention is not limited to this configuration, and the same capability may be downloaded to the apparatus from the network or the same capability recorded in the recording medium may be installed in the apparatus. The recording medium can be a recording medium of any format, such as a CD-ROM, as long as it is capable of storing the programs and readable by the apparatus. The capability obtained by pre-installment or downloading as described above may be the one achieved in cooperation with the OS (Operating System) in the apparatus or the like.

What is claimed is:

1. An automatic job template generating apparatus, comprising:
    an operation history acquisition unit configured to acquire an operation history of a multi function peripherals by a user in a correspondence with the user;
    an operation frequency analysis unit configured to analyze an operation frequency at specific timing according to the operation history acquired by the operation history acquisition unit;
    a job template generation unit configured to automatically and newly generate a job template having a high operation frequency on an operation screen as a job template button according to an analysis result by the operation frequency analysis unit, without acquiring an operation input for generating a new job template by a user;
    an image history save unit configured to save an image of an executed job as an image history;
    a time interval determination unit configured to determine whether a time interval between continuous two images saved in the image history save unit is shorter than a specific threshold value;
    a same image determination unit configured to determine, when the time interval determination unit determines that the time interval is shorter than the specific threshold value, whether the two images are a same image; and
    a multi-job template button generation unit configured to generate a job template button of multiple jobs by integrating two or more operations in the operation history acquired by the operation history acquisition unit when the same image determination unit determines that the two images are the same image.

2. The automatic job template generating apparatus according to claim 1, wherein:
    the operation history acquired by the operation history acquisition unit is at least one of information about a key input, a class of job, a job execution parameter, an image history, and a job set value at a point in time when a start button is depressed, and identification information of an operator.

3. The automatic job template generating apparatus according to claim 1, wherein:
    the specific timing at which the operation frequency analysis unit analyzes the operation frequency is at least one of regular intervals, each time a job ends, and when a non-operated state has continued over a certain time.

4. The automatic job template generating apparatus according to claim 1, further comprising:
    a notification unit configured-to notify a user that the job template has been newly generated by the job template generation unit.

5. The automatic job template generating apparatus according to claim 4, wherein:
    the notification unit notifies the information informing that the job template button has been newly generated using one of a display by blinking and a display in a color different from colors of other job template buttons.

6. The automatic job template generating apparatus according to claim 4, wherein:
    the notification unit displays the information informing that the job template button has been newly generated by displaying a balloon popup.

7. The automatic job template generating apparatus according to claim 4, wherein:
    the notification unit notifies the user that the job template has been newly generated by the job template generation unit via an e-mail.

8. The automatic job template generating apparatus according to claim 1, further comprising:
an image history save unit configured to save an image of an executed job as an image history;
a similar image determination unit configured to determine whether there is a similar image in past times by analyzing the image history saved in the image history save unit; and
a job execution unit configured to execute a job, when the similar image determination unit determines that there is the similar image in past times, using a job execution parameter corresponding to the similar image.

9. An automatic job template generating apparatus, comprising:
operation history acquisition means for acquiring an operation history of a multi function peripherals by a user in a correspondence with the user;
operation frequency analysis means for analyzing an operation frequency at specific timing according to the operation history acquired by the operation history acquisition means;
job template generation means for automatically and newly generating a job template having a high operation frequency on an operation screen as a job template button according to an analysis result by the operation frequency analysis means, without acquiring an operation input for generating a new job by a user;
image history save means for saving an image of an executed job as an image history;
time interval determination means for determining whether a time interval between continuous two images saved in the image history save means is shorter than a specific threshold value;
same image determination means for determining, when the time interval determination means determines that the time interval is shorter than the specific threshold value, whether the two images are a same image; and
multi-job template button generation means for generating a job template button of multiple jobs by integrating two or more operations in the operation history acquired by the operation history acquisition means when the same image determination means determines that the two images are the same image.

10. The automatic job template generating apparatus according to claim 9, wherein:
the operation history acquired by the operation history acquisition means is at least one of information about a key input, a class of job, a job execution parameter, an image history, and a job set value at a point in time when a start button is depressed, and identification information of an operator.

11. The automatic job template generating apparatus according to claim 9, wherein:
the specific timing at which the operation frequency analysis means analyzes the operation frequency is at least one of regular intervals, each time a job ends, and when a non-operated state has continued over a certain time.

12. The automatic job template generating apparatus according to claim 9, further comprising:
notification means for notifying a user that the job template has been newly generated by the job template generation means.

13. The automatic job template generating apparatus according to claim 12, wherein:
the notification means notifies the information informing that the job template button has been newly generated using one of a display by blinking and a display in a color different from colors of other job template buttons.

14. The automatic job template generating apparatus according to claim 12, wherein:
the notification means displays the information informing that the job template button has been newly generated by displaying a balloon popup.

15. The automatic job template generating apparatus according to claim 12, wherein:
the notification means notifies the user that the job template has been newly generated by the job template generation means via an e-mail.

16. The automatic job template generating apparatus according to claim 9, further comprising:
image history save means for saving an image of an executed job as an image history;
similar image determination means for determining whether there is a similar image in past times by analyzing the image history saved in the image history save means; and
job execution means for executing a job, when the similar image determination means determines that there is the similar image in past times, using a job execution parameter corresponding to the similar image.

17. An automatic job template generation method for automatically generating a job template in allowing a multi function peripherals to execute a job, comprising the steps of:
acquiring an operation history of a multi function peripherals in a correspondence with a user according to the operation history of the multi function peripherals;
analyzing an operation frequency at specific timing according to the operation history acquired in the step of acquiring the operation history;
automatically and newly generating a job template having a high operation frequency on an operation screen as a job template button according to an analysis result in the step of analyzing the operation frequency, without acquiring an operation input for generating a new job template by a user;
saving an image of an executed job in an image history;
determining whether a time interval between continuous two images saved in the image history is shorter than a specific threshold value;
determining, when the time interval is shorter than the specific threshold value, whether the continuous two images are a same image; and
generating a job template button of multiple jobs by integrating two or more operations in the operation history acquired in the step of acquiring the operation history when the continuous two images are the same image.

18. The automatic job template generation method according to claim 17, wherein:
the specific timing at which the operation frequency is analyzed in the step of analyzing the operation frequency is at least one of regular intervals, each time a job ends, and when a non-operated state has continued over a certain time.

* * * * *